United States Patent [19]

Kaplan

[11] Patent Number: 4,977,521

[45] Date of Patent: Dec. 11, 1990

[54] FILM NOISE REDUCTION BY APPLICATION OF BAYES THEOREM TO POSITIVE/NEGATIVE FILM

[75] Inventor: Martin C. Kaplan, Rochester, N.Y.

[73] Assignee: Eastman Kodak Company, Rochester, N.Y.

[21] Appl. No.: 223,812

[22] Filed: Jul. 25, 1988

[51] Int. Cl.$^5$ .......................... G01J 3/40; G03C 7/00
[52] U.S. Cl. ................... 364/525; 364/571.07; 364/526; 358/80; 382/17; 430/359
[58] Field of Search ................ 364/525, 526, 571.01, 364/571.07; 358/80; 382/16–19, 22, 39; 430/359, 330, 398, 400, 394, 434; 356/404

[56] References Cited

U.S. PATENT DOCUMENTS

| | | | |
|---|---|---|---|
| 4,090,243 | 5/1978 | Kotera et al. | 364/526 |
| 4,574,393 | 3/1986 | Blackwell et al. | 364/526 |
| 4,638,456 | 1/1987 | Elias et al. | 364/525 |
| 4,666,307 | 5/1987 | Matsumoto et al. | 364/525 |
| 4,777,102 | 10/1988 | Levine | 430/394 |
| 4,788,131 | 11/1988 | Kellogg et al. | 430/394 |
| 4,812,390 | 3/1989 | Giannesi | 430/434 |

OTHER PUBLICATIONS

Bird, "Normal Development, Reversal Development, and Composite Processing: A New Method for Gaining Simultaneous Improvement in Latitude and Detective Quantum Efficiency in Silver Halide Films," Photographic Science and Engineering, vol. 22, No. 6, pp. 328–335 (Nov./Dec. 1978).

Primary Examiner—Parshotam S. Lall
Assistant Examiner—Brian M. Mattson
Attorney, Agent, or Firm—James A. Smith

[57] ABSTRACT

At least one frame of a strip of photographic film is exposed to an image, and, prior to being developed, six (or so) calibration strips in a specially reserved frame on the same film are individually exposed to six predetermined calibration light sources producing six progressively increasing exposure levels spanning the exposure latitude of the film. A film layer develops a positive image in one color and a negative image in another color using positive and negative dyes, respectively. The film is scanned to determine the positive and negative dye amounts, $D_p$ and $D_n$ at each scanner pixel. The likeliest exposure value $\overline{E}$ as a function of $D_n$ and $D_p$ is determined probabilistically from six histograms obtained by scanning the six calibration patches on the film, all of the $\overline{E}$'s thus obtained being stored in a look-up table addressed by the corresponding values of $D_p$ and $D_n$. The images recorded on the film are then scanned pixel-by-pixel, the $D_p$ and $D_n$ of each pixel addressing the look-up table to obtain the likeliest exposure value $\overline{E}$ for that pixel, which is then furnished to a printer. By thus combining the positive and negative images on the film, film noise is reduced in the resulting image to obtain the likeliest exposure value $\overline{E}$ at each pixel with the smallest error possible with no prior knowledge of the film characteristics.

51 Claims, 7 Drawing Sheets

FIG. 5

FOR $i = 1-6$ (Six Calibration Exposures)
COMPUTE FOR EACH $i$

MEAN
(a) $\bar{D}_n(E_i) = \frac{1}{N} \sum_{j,k} D_n(j,k;E_i)$

N = Number of pixels in calibration patch
$j, k$ index the pixels

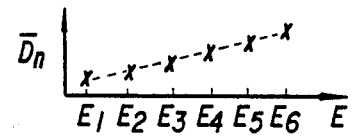

MEAN
(b) $\bar{D}_p(E_i) = \frac{1}{N} \sum_{j,k} D_p(j,k;E_i)$

COVARIANCE (also called variance)
(c) $S_{nn}(E_i) = \frac{1}{N-1} \sum_{j,k} \left[ D_n(j,k;E_i) - \bar{D}_n(E_i) \right] \left[ D_n(j,k;E_i) - \bar{D}_n(E_i) \right]$

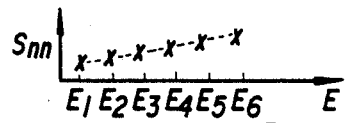

COVARIANCE (also called variance)
(d) $S_{pp}(E_i) = \frac{1}{N-1} \sum_{j,k} \left[ D_p(j,k;E_i) - \bar{D}_p(E_i) \right] \left[ D_p(j,k;E_i) - \bar{D}_p(E_i) \right]$

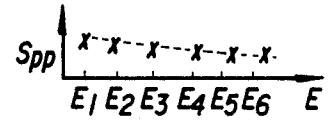

COVARIANCE
(e) $S_{pn}(E_i) = \frac{1}{N-1} \sum_{j,k} \left[ D_p(j,k;E_i) - \bar{D}_p(E_i) \right] \left[ D_n(j,k;E_i) - \bar{D}_n(j,k;E_i) \right]$

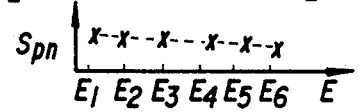

THEN: Divide the horizontal axis ($E$) into 255 segments
between 256 points $E_m$ ($m = 1, \ldots, 256$)
FOR EACH $E_m$, INTERPOLATE VALUES $\bar{D}_n(E_m), \bar{D}_p(E_m), S_{nn}(E_m), S_{pp}(E_m), S_{pn}(E_m)$ By an interpolation technique such as linear interpolation
or quasi-cubic Hermite interpolation
THEN USING MULTIVARIATE GAUSSIAN PROBABILITIES, (f)
$P(D_p, D_n | E_m) = \left[ 2\pi \, DET \begin{pmatrix} S_{pp} & S_{pn} \\ S_{pn} & S_{nn} \end{pmatrix} \right]^{-\frac{1}{2}} \exp \left[ -\frac{1}{2} \begin{pmatrix} D_p - \bar{D}_p(E_m) \\ D_n - \bar{D}_n(E_m) \end{pmatrix}^T \begin{pmatrix} S_{pp} & S_{pn} \\ S_{pn} & S_{nn} \end{pmatrix}^{-1} \begin{pmatrix} D_p - \bar{D}_p(E_m) \\ D_n - \bar{D}_n(E_m) \end{pmatrix} \right]$

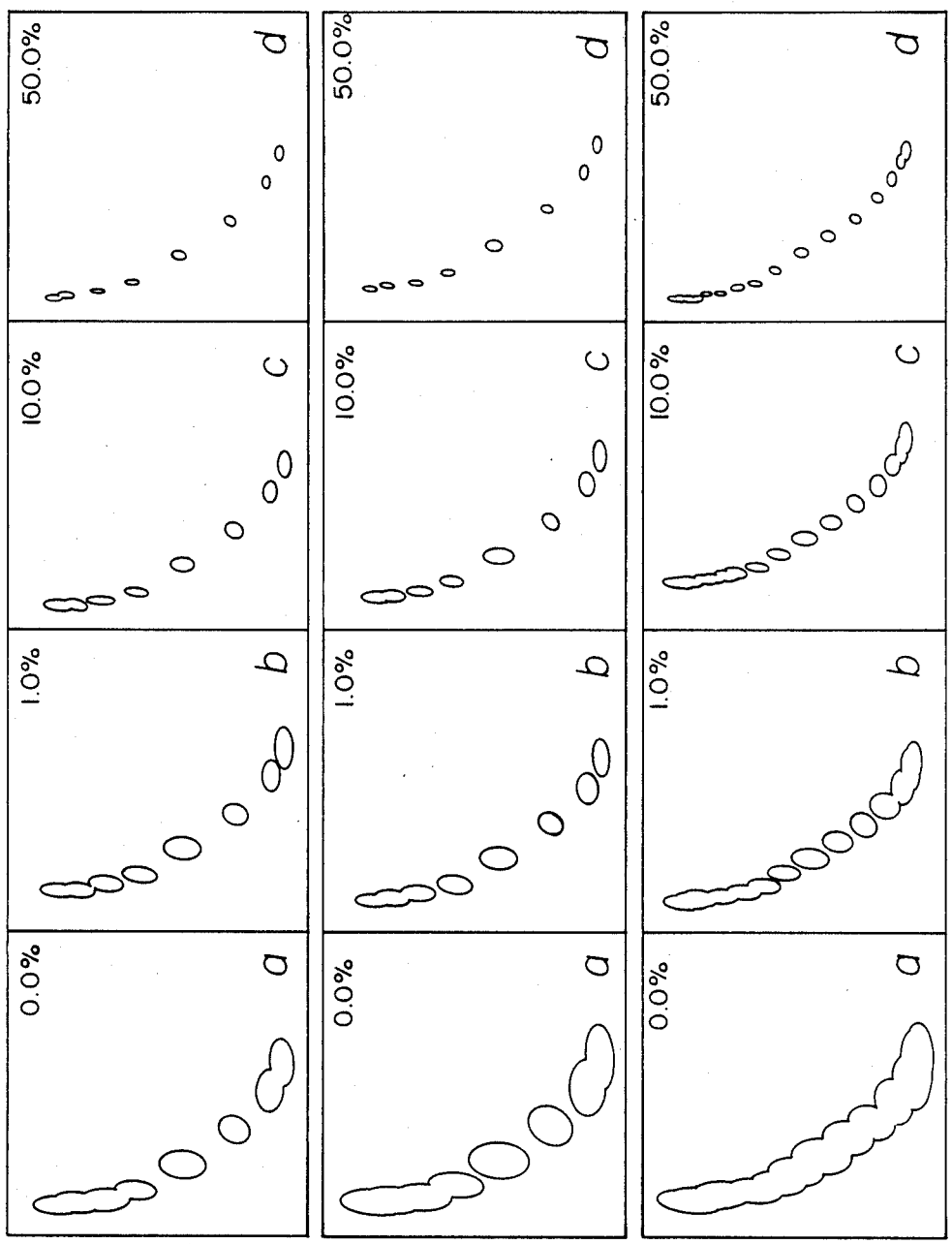
FIG. 8 (a-d)
FIG. 10 (a-d)
FIG. 9 (a-d)

FILM NOISE REDUCTION BY APPLICATION OF BAYES THEOREM TO POSITIVE/NEGATIVE FILM

TECHNICAL FIELD

This invention is related to processes for improving images obtained from photographic film and in particular to reducing film noise in the photographic images so obtained.

BACKGROUND OF THE INVENTION

Main Problem

Noise attributable to innate characteristics of photographic film limits the quality of images obtainable from photographic film. The major source of such noise is random variations in the density of silver halide grains across the surface of a film emulsion layer. If the film is divided into many picture elements ("pixels") which are sampled individually, each pixel will have a different number of silver halide grains. Such random variations in the number of silver halide grains in each "pixel" on the film causes different pixels to respond differently to the same incident light. Upon chemical development, pixels with more grains develop higher dye densities. These pixel-by-pixel variations in density appear as granularity. This can be thought of as random pixel-to-pixel variations in sensitivity—pixels with more grains are more sensitive, having a higher response to the same incident light.

However, by independently developing and digitally scanning both latent and non-latent silver halide grains in each pixel, the total number of grains in each pixel can be determined. Using this information, the random variations in the number of grains per pixel on film may be compensated by simply normalizing or dividing the number of latent (or non-latent) grains counted in a given pixel by the total number of latent and non-latent grains in that pixel.

Typically, using a single dye (positive or negative), scanning the film yields either the number of non-latent grains or the number of latent grains in each pixel, but not both numbers. In order to obtain both numbers, two different color dye are used, one dye responsive only to the non-latent grains and the other dye responsive only to the latent grains. By developing the same film with both dyes, and by scanning the film with two different color filters tuned individually to each of the two dyes, the scanner can separately count the number of latent and non-latent crystals in the film. Such a process is described in detail by Bird, "Normal Development, Reversal Development, and Composite Processing: A New Method for Gaining a Simultaneous Improvement in Latitude and Detective Quantum Efficiency in Silver Halide Films," *Photographic Science and Engineering*, Vol. 22, No. 6, pages 328-335, November/December, 1978 (hereinafter referred to as "Bird"). The Bird reference proposes an algorithm for combining the densities of $D_n$ and $D_p$ by individually weighting them and then computing the exposure from the combination. The Bird algorithm optimizes the detective quantum efficiency (the ratio between the input noise and the output noise of the process) requiring certain assumptions in film characteristics, the main assumption being an idealized monodisperse emulsion in the film. This assumption means that the silver halide grains are of identical size throughout the emulsion so that each grain: (1) presents the same photon absorption cross-section "area", (2) requires the same number of photons in order to become latent, (3) lies at the same height as all other grains in the emulsion so as not to obscure one another, and (4) produces the same amount of dye.

Secondary Problem

The foregoing assumption clearly cannot be relied upon in processing real film. Therefore, the process, as described in the Bird reference above, introduces errors or noise into the resulting reconstructed image. This is because the process does not take into account secondary sources of noise in real film, specifically the non-monodisperse nature of the real film emulsion. The grains in such a real emulsion do not have the same photon absorption cross-section, do not require the same number of photons for becoming latent, do not lie at the same height in the film layer, and produce different amounts of dye. Thus, known processes, such as that described in the Bird reference, for reducing film noise introduce additional sources of error attributable to secondary noise sources in the film.

PROBLEM TO BE SOLVED

What is needed is a process for reducing film noise attributable to random variations in the density of active grains across a film emulsion without requiring prior assumption of film characteristics, and which is therefore less affected by any of the sources of film noise discussed above. In the present invention, it is recognized that the prior approach to solving this class of problems was unworkable. This approach was based upon trying to understand the sources of noise in film, to mathematically model them, and then by some mathematical technique invert the process to remove the noise. The Bird reference is an example of this approach in which only the primary source of noise was considered while the secondary sources were ignored.

In the present invention, a different approach is taken, namely to eschew any understanding of the sources of noise in film or any attempt to mathematically model them, and instead process the data from the positive and negative dye images in such a manner as to automatically take into account all sources of noise without having to understand them. The advantage of such an approach is that it does not depend upon the simplifying assumption of the algorithm proposed in the Bird reference (namely the assumption of a monodispersive emulsion), and therefore can be used with a real film.

SUMMARY OF THE INVENTION

A user exposes the frames on a roll of film to a number of scenes, but the last frame on the roll of film is reserved for calibration purposes. Before the roll of film is developed, the last frame is divided into six patches and the six patches are exposed to six different predetermined exposure levels comprising a set of six exposure levels spanning the estimated film latitude. (The number of calibration patches is arbitrary.) If the film comprises more than one emulsion layer (such as color film), then one (or more) emulsion layer is developed using positive and negative dyes of different colors responsive to the non-latent and latent grains in the film, respectively. A scanner, such as a CCD imager, scans each of the six calibration patches twice, on the first pass through a filter tuned to the color of the positive dye and on the second pass through a filter tuned to the color of the negative dye.

During the first pass, the scanner measures the dye amount from the non-latent grains in each pixel in each calibration patch, and during the second pass measures the dye amount from the latent grains in each pixel in each calibration patch. From the dye amount measurements thus produced by the scanner, six histograms are constructed, one for each of the six calibration patches. Each histogram represents the distribution of the number of pixels as a function of the dye amount per pixel of positive and negative dye sites sensed by the scanner.

Each of the histograms is treated as a graph of the probability that, given a particular exposure level E, any pixel will develop a certain positive dye amount $D_p$ and a certain negative dye amount $D_n$. The six histograms, which will now be referred to as probability distributions, are stored in memory.

Each user image on the film is now scanned. The most probable exposure value for each pixel in a user image is computed from the six probability distributions previously obtained. The following is one way for performing the computation in accordance with the invention: The positive and negative dye amounts $D_p$ and $D_n$ of a particular user image pixel sensed by the scanner are observed. Then, the six probability distributions are each evaluated at the observed values of $D_n$ and $D_p$ to yield six corresponding probabilities. Each of the six probability values thus obtained is then multiplied by the exposure value of the corresponding one of the six calibration patches to obtain a weighted exposure value. The six weighted exposure values thus obtained are added together and the resulting sum is divided by the sum of all six probability values to obtain the most probable exposure value of the image pixel in question. In proper statistical language, this is not precisely the "most probable" exposure, but rather is the "mean" exposure, which often is more desirable. The foregoing is repeated for each pixel in a frame on the film containing the exposed user image. The likeliest exposure values thus computed are fed to a printer which generates the user image.

The foregoing process is a simplification of the general process of this invention.

In the preferred embodiment of the invention, a more sophisticated algorithm is used for accurately interpolating a continuum of exposure values among the six calibration exposures, which takes into account the different probability distributions involved. Furthermore, an a priori probability that a pixel will receive a certain exposure E is determined and accounted for in the preferred algorithm.

GAUSSIAN INTERPOLATION

For computation of exposure values lying between successive ones of the six calibration exposure levels, the preferred embodiment of the invention includes a unique interpolation process which is as follows:

The mean values of $D_n$ and $D_p$, their variances and their covariances are computed for each of the six probability distributions derived from the six calibration patches. If the scanner is an eight-bit CCD Scanner (for example), a likely choice is to divide the exposure scale defined by the six calibration exposures into 256 exposures. The mean, the variance and the covariance of $D_n$ and of $D_p$ are each plotted against the six calibration exposure values and interpolated at 256 points along the exposure scale. Preferably, a well-known method of interpolation using cubic splines is employed. This produces 256 interpolated values of the mean, the variance and the covariance. From these, 256 new probability distributions are constructed from each of the 256 sets of mean, variance and covariance values by simply assuming that the new probability distribution at each one of the 256 interpolated points is multivariate-Gaussian. Each of the Gaussian probability distributions is, in accordance with well-known principles, uniquely defined by the corresponding mean, variance and covariance at the corresponding one of the 256 interpolated exposure values.

Next, the image processing algorithm described in the previous sub-section above is performed but, instead of using the six probability distributions obtained from the six calibration patches, the 256 new probability distributions are used. The likeliest exposure value for a given user pixel is computed as a weighted sum over all 256 probability distributions, resulting in a "likeliest" exposure value.

Exposure Probability Distribution

In a further refinement of the preferred embodiment of the algorithm, each of the probability distributions, corresponding to a given exposure level, is first multiplied by the probability of receiving that exposure value before it is used in the algorithm. The probability of receiving a given exposure level is computed a priori from a large collection of representative photographs or images. For example, a large collection of consumer photographs may be scanned if the user image is to be processed for consumer type images. On the other hand, in order to process astronomical images, a large collection of astronomical photographs may be scanned to compute the required exposure probabilities.

SCRATCH DETECTION AND SUPPRESSION

The algorithm may also be used to locate defective pixels, such as from scratches or dust. Whenever a particular pixel is detected with joint positive and negative dye amounts $D_p$ and $D_n$ yielding a very low probability when substituted into each of the probability distributions (such as those constructed from the calibration patches), that pixel is designated as a defective pixel.

A scratch suppression algorithm may then be employed. In one such scratch suppression algorithm, for each pixel recognized as being defective, the suppression algorithm defines a small neighborhood of pixels around the defective pixel. It searches that neighborhood for any non-defective pixels, and keeps enlarging the neighborhood until it finds at least one non-defective pixel in the neighborhood. It then computes the median of all the non-defective pixels in the neighborhood, and replaces the original defective pixel by this median.

ADVANTAGE OF THE INVENTION OVER THE PRIOR ART

The probability distributions obtained from the calibration patches characterize all noise sources present in that film, as well as in the scanner. These noise sources include random variations in grain density, random variations in grain size, random variations in photon absorption cross-section per grain, random variations in number of photons required to transform a grain to non-latency from latency, and variations in grain height in the emulsion causing some grains to obscure other grains, and even effects occurring only after development such as dye clouds obscuring other dye clouds and variations in the dye per grain. To the extent that the film response is statistically uniform everywhere on the strip of film, the probability distributions obtained from the calibration patches accurately reflect all of the foregoing noise sources. Thus, the image processing algorithm of the invention requires absolutely no knowledge whatsoever of the film characteristics prior to execution of the algorithm. (The only exception is that the progression of exposure values of the plural calibration patches should span the exposure latitude of the film.) Thus, the algorithm makes no assumptions about grain size distribution, variations in the number of grains per pixel, fog levels, stain levels, non-linearity in the development process, photon thresholds of the grains or many other sources of noise. It does not depend upon any mathematical model to explain the behavior of the film, but instead relies on the calibration patches to provide an empirical "understanding" of the film.

It can be shown mathematically (based on Bayes' Theorem) that the algorithm of the present invention provides the estimate with the minimum mean squared error for the exposure level of each pixel, and any other algorithm will result in a larger mean squared error. It is in this sense that the algorithm of the invention is optimal.

DESCRIPTION OF THE DRAWINGS

The invention may be understood by reference to the accompanying drawings of which:

FIG. 5 illustrates a refinement of the algorithm of FIG. 4 in which the several probability distributions of FIG. 2 are interpolated to generate many probability distributions;

FIGS. 8a–8d illustrate cross-sections at four selected amplitudes of the probability distributions obtained from histogramming the calibration patches on a real film;

FIGS. 9a–9d illustrate the actual results obtained by interpolating between the probability distributions of FIGS. 8a–8d; and FIGS. 10a–10d illustrate the interpolated probability distributions of FIGS. 9a–9d at the same exposures as FIGS. 8a–8d to demonstrate that the interpolated data resembles the original data.

DETAILED DESCRIPTION OF THE INVENTION

Film Calibration

Figure 1:
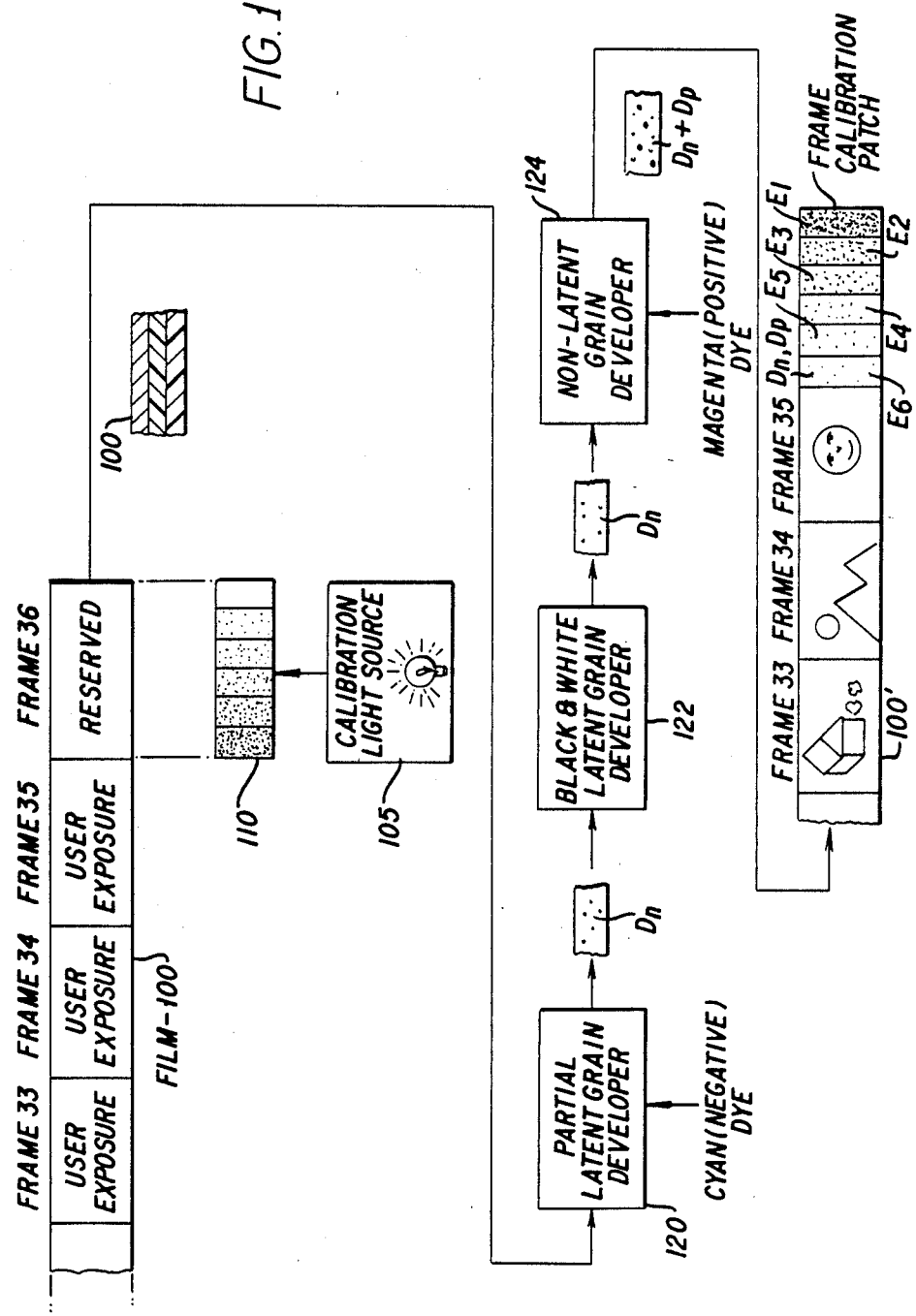
FIG. 1 is a block diagram illustrating the joint positive and negative development process of a film bearing a series of calibration patches.

Referring to FIG. 1, a roll of film 100 may have, for example, 36 frames. In the present invention, the user is allowed to take pictures on the first 35 frames, the 36th frame being reserved for use by the film development lab and is therefore not exposed by the user. (Alternatively, it may be exposed during manufacture, or by a special device within the camera.) When the film 100 is received by the film development lab, frame 36 is divided into a number of patches (for example, six patches), each patch being exposed to a different predetermined exposure level from a calibrated light source 105. One way of doing this is to simply lay a six exposure level gray scale mask 110 over frame 36 and then activate the calibrated light source 105.

Joint Positive and Negative Image Development

The film 100 is then developed using a special joint positive-negative image development process. If the film 100 is, for example, color film, it essentially comprises three different color layers. In one realization of this invention, only one film layer (usually the top, green layer) is subjected to the joint positive-negative image development process, the remaining two layers being developed using ordinary processing techniques. The joint positive-negative image development process of the invention is illustrated in FIG. 1 and is as follows:

The top film layer is first developed by a partial latent grain developer 120 which develops only a fraction of the latent grains in the top layer of the film 100. Latent grains, as the term is employed in this specification, are those silver halide crystals which have absorbed enough photons during the exposure of the film to experience a chemical change. The partial grain developer 120 creates a dye of one color (for example, cyan), which colors the film at each latent grain site developed by the developer 120. The result is a negative dye density $D_n$ which varies across the top layer of the film 100 so as to define a negative cyan color image. Thereafter, a black and white latent grain developer 122, creating no color dyes, develops the remaining latent crystals which were not developed by the partial latent grain developer 120. Thus the latent grains have been developed to yield a negative dye density $D_n$ defining a cyan negative image.

The film is then processed with a non-latent grain developer 124 which develops all of the non-latent grains in the top layer of the film 100 creating a different colored positive dye (for example a magenta dye) so that all of the non-latent grain sites in the top layer of the film 100 are marked by a magenta dye spot. Non-latent grains, as the term is employed in this specification, are those silver halide crystals in the top layer of the film 100 which have not absorbed a sufficient number of photons during the exposure of the film to experience a chemical change to make them responsive to the previous developers 120 and 122. The result is a positive dye (magenta) density $D_p$ which varies across the top layer of the film 100 to define a magenta colored image.

Thus, the top layer of the film 100 bears two images of different colors, a negative cyan image and a positive magenta image. The result is illustrated in the developed film strip 100' in FIG. 7. Each of the six calibration patches in frame 36 also has a cyan negative image and a magenta positive image of generally uniform density across the patch. Generally, as the cyan density increases from patch to patch, the magenta density decreases.

The problem now is how to overcome the effect of film granularity which degrades the quality of the user images in frames 1–35.

Computing the Conditional Probability Functions of Joint Dye Densities for Each Exposure Level Each of the six calibration patches in frame 36 is now used to construct the probability function of the joint positive and negative dye densities $D_n$, $D_p$ for each of the six exposure levels. This is done as follows: An electronic image scanner 200 such as a CCD imager scans each of the six calibration patches in frame 36, one at a time. The scanner 200 views each calibration patch as simply a plurality of pixels, the number of which depends upon the resolution of the scanner 200. The scanner 200 first views the calibration patch in question through a green filter (complementary to magenta) so as to detect the positive dye density $D_p$ at each pixel. Then the scanner 200 views the calibration patch through a red filter (complementary to cyan) so as to detect the negative dye densities $D_n$ at each pixel. The scanner 200 observes each of the positive and negative dye densities $D_p$, $D_n$ as the brightness of a particular pixel when viewed through a green or red filter respectively. The data thus obtained from the scanner for each calibration patch (exposure level) is combined as a histogram for that exposure level, defining the number of pixels sensed by the scanner 200 having a particular joint density value $D_p$, $D_n$. The results are plotted in FIG. 2, in which the data created by the scanner 200 from each of the six calibration patches of frame 36 yields a three-dimensional "bell" curve, the two horizontal axes corresponding to values of $D_n$ and $D_p$ respectively, and the vertical axis corresponding to the number of pixels at each joint value $D_n$, $D_p$. In this invention, each of these histograms is viewed as the conditional probability distribution for finding a joint dye density value $D_p$, $D_n$ given a particular exposure value $E_i$. In this example, there were six calibration patches so there are six conditional joint probability distribution functions, as illustrated.

Figure 2:
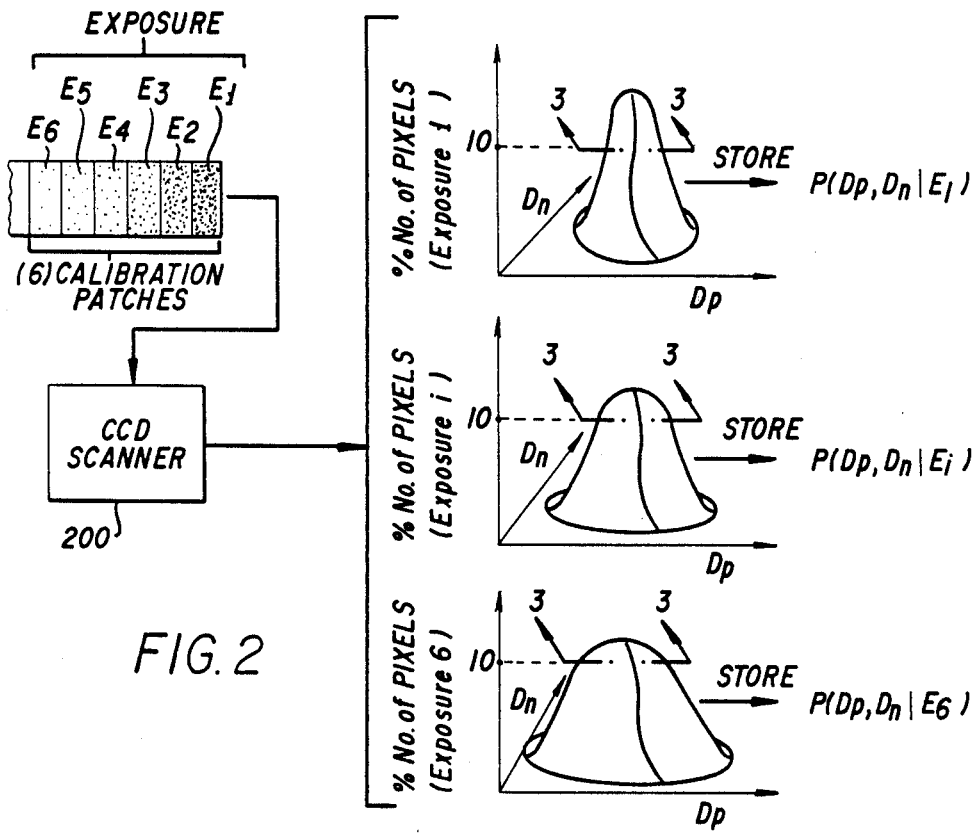
FIG. 2 is a diagram illustrating the generation of an individual probability distribution from each one of the calibration patches on the film.
Figure 3:
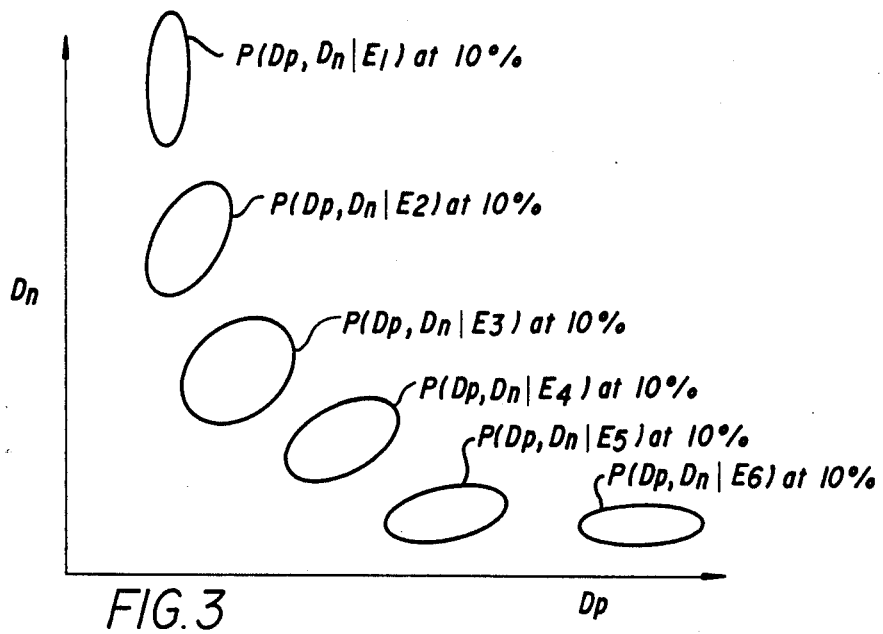
FIG. 3 is a graph illustrating the cross-sections of the probability distributions obtained from all the calibration patches on the film.

A cross-section 3—3 of each of the six joint probability distribution functions of FIG. 2 may be taken at a chosen amplitude, say 10% of the maximum number of pixels counted by the scanner 200. Each of these cross-sections may then be superimposed as illustrated in FIG. 3, in order to provide an understanding as to how the joint probability distributions differ among the six exposure values of the calibration patches of frame 36 in FIG. 2.

The scanner 200 may be thought of as a CCD imager characterized by a square array of photon-collection sites, comprising n rows and n columns of such sites. Each site defines one pixel, so that there are $n^2$ pixels in the imager. In one embodiment of the invention, the scanner takes one "snapshot" of each calibration patch through the red filter and then one shot of each calibration patch through the green filter to generate the data required. If the signal created at each of the photon-collection sites in the scanner 200 is converted by an analog-to-digital converter to an eight-bit byte, then each pixel has a dynamic range from 0 to 255 units. In this case the units specify the minimum and maximum detectable values of the negative and positive dye densities $D_n$, $D_p$. Thus, each of the six pairs of horizontal axes labeled $D_n$ and $D_p$ of FIG. 2 extend from normalized dye density values 0 through 255. The vertical axis represents the percentage of the total number of pixels. In this example, the total number of pixels is $n^2$. Typically, in CCD imagers suitable for the present application, $n^2$ is on the order of half a million pixels.

The data representing each of the six joint probability distributions illustrated in FIG. 2 is stored in memory. In this application the data characterizing each of the six joint probability distributions illustrated in FIG. 2 may be thought of as an XY addressable memory, in which the X axis corresponds to the 256 possible values of $D_n$, the Y axis corresponds to the 256 possible values of $D_p$ and the data stored in each of the X, Y locations in the memory are the corresponding pixel counts from the scanner 200. Such an X, Y array of data shall be denoted in this application $P(D_p, D_n | E_i)$, using conventional notation from statistical mathematics. P is the conditional probability value that, given a particular exposure value $E_i$, a pixel selected at random will be found to have a particular joint positive and negative dye value $D_p$, $D_n$. Each joint probability distribution function illustrated in FIG. 2 is labeled using this same notation.

Computation of the Probability of Having Received a Particular Exposure Value Given a Certain Joint Dye Density Value $D_n$, $D_p$ The six joint probability distributions $P(D_p, D_n | E_i)$ generated for the six calibration exposures may be used in combination to infer the related conditional probability $P(E_i | D_p, D_n)$. In accordance with conventional notation, the latter is the probability that, given an observed joint positive and negative dye density value $D_n$, $D_p$, a particular exposure value $E_i$ was received by the pixel in question. Given that a particular joint dye density value $D_n$, $D_p$ is observed at a given pixel, the question is: what is the probability that that particular pixel received a certain exposure value $E_i$? This quantity is $P(E_i | D_p, D_n)$.

The answer to this question is obtained using the well-known Bayes theorem of statistical mathematics. One additional piece of information is needed, the a priori probability For a given exposure $E_i$, designated $P(E_i)$. This is the probability that the pixel has received exposure $E_i$, based on no knowledge of $D_p$, $D_n$. This may be obtained by histogramming many typical photographs. Then according to Bayes theorem, the probability that one of the six exposures $E_1, \ldots, E_6$ was received by the pixel is:

$$P(E_j | D_p, D_n) = P(D_p, D_n | E_j) P(E_j) / \sum_{i=1}^{6} P(D_p, D_n | E_i). \quad (1)$$

By interpolating 256 exposures among the measured six exposures (FIG. 5), exposure $E_j$ may be determined with greater resolution.

This result may be used to enhance the user images stored in frames 1-35 of the film 100, as follows:

Computation of the Most Probable Exposure Value from a Given Joint Dye Density Value $D_n$, $D_p$ The most probable (or more accurately the "mean") exposure value may be computed for each joint dye density value $D_p$, $D_n$ observable by the scanner 200, and this value shall be labeled herein $\overline{E}(D_p, D_n)$, or simply $\overline{E}$.

For a particular pixel, $\overline{E}$ is the normalized sum of the six calibration exposure values $E_i$ (for all i from 1 through 6) individually weighted (multiplied) by the probability amplitudes $P(E_i | D_n, D_p)$ (as defined above in equation 1) evaluated at the observed joint dye density value $D_p$, $D_n$ of the particular pixel. Using the definition of equation 1, this weighted sum is:

$$E(D_p, D_n) = \sum_{i=1}^{m} E_i P(D_p, D_n|E_i) P(E_i) / \sum_{i=1}^{m} P(D_p, D_n|E_i) P(E_i). \quad (2)$$

Figure 4:
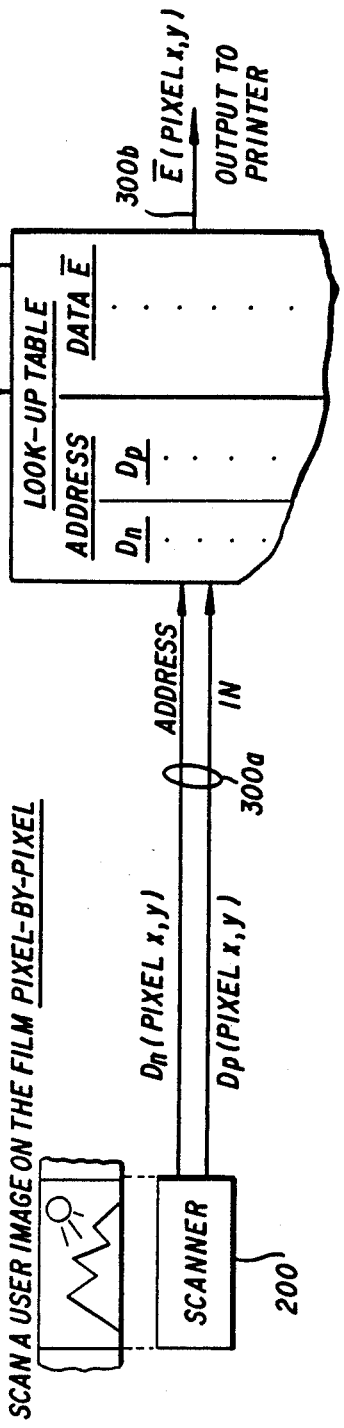
FIG. 4 is a block diagram illustrating the image processing algorithm of the invention using the probability distributions of FIG. 2.

The evaluation of the six probability distribution functions at each of the $256^2$ possible joint density values $D_p$, $D_n$ (assuming the scanner 200 has an eight-bit resolution) requires $256^2$ different computations using equation 2. The result is $256^2$ values of $\overline{E}$ associated with corresponding ones of the $256^2$ possible joint dye density values $D_p$, $D_n$. As illustrated in FIG. 4, these results are stored in a look-up table in which a most probable (mean) exposure value $\overline{E}$ is stored in a location addressed by the corresponding joint dye density value $D_p$, $D_n$. The look-up table 300 is the key in processing each of the user images in frames 1-35 of the film 100 through the scanner 200. For better precision, the six exposures $E_i$ are replaced by the 256 interpolated exposures.

Joint Positive-Negative Dye Image Enhancement of User Images

Now the scanner 200 scans a given one of the user images stored in one of the frames 1-35 of the film 100. Each pixel in a given user image is determined by the scanner 200 to have a certain positive dye density $D_p$ and a certain negative dye density $D_n$, each of these dye densities lying somewhere between a value of 0 and 255, assuming the scanner has eight bits of resolution. For each pixel, the scanner 200 transmits the observed joint dye density value $D_p$, $D_n$ to the address input 300a of the look-up-table 300. The look-up table 300 responds (in the manner of a programmable read only memory) by transmitting the corresponding likeliest exposure value $\overline{E}$ at its data output 300b. A succession of likeliest exposure values defining an enhanced version of the user image is thus transmitted in an order determined by the scanner 200 to an output device such as a printer.

REDUCTION OF NOISE

It is clear that obtaining independent images from the latent and non-latent grains in the film provides more information from a given image exposure than development of only one or the other of the positive and negative images. With this additional information, it is clear that the noise in the resulting image should be reduced. The question is how to combine the information from the positive and negative images without introducing new sources of noise or distortion. It can be proven mathematically that the algorithm described above computes a probable exposure value for each scanned pixel in the film with the minimum mean squared error theoretically possible, and that any other method will result in a larger mean squared error in the computed exposure value. Equations 1 and 2 are the direct result of Bayes theorem in statistics, and may be simplified as follows:

$$P(E|D_p, D_n) = \frac{P(D_p, D_n|E)}{\sum_i P(D_p, D_n|E_i)} \quad (3)$$

$$E = \frac{\sum_i E_i P(D_p, D_n|E_i)}{\sum_i P(D_p, D_n|E_i)} \quad (4)$$

The simplification of equations 3 and 4 from equations 1 and 2 is obtained by assuming P(E) (which is the a priori probability that a given exposure level will be received) is the same for all exposure values—and is therefore conveniently defined to be unity. This results in only a small degradation in the performance of the algorithm.

In a more complex embodiment of the invention, P(E) is not uniform and is inferred from a large collection of photographs from consumer images (if consumer film is to be processed) or astronomy images (if astronomical photographs are to be processed), etc.

GAUSSIAN INTERPOLATION OF THE JOINT PROBABILITY DISTRIBUTIONS

From equation 2, it is apparent that in most cases the likeliest exposure value $\overline{E}$ will lie somewhere between various ones of the six calibration exposure values (used to generate the calibration patches of frame 36 of the film 100), and therefore should be properly interpolated. Experimental results obtained using this invention indicate that the joint probability distribution functions such as those illustrated in FIG. 2 (obtained from the calibration patches) are approximately Gaussian in nature. Therefore, for a more accurate computation of likely exposure values $\overline{E}$ which lie between adjacent ones of the six calibration exposure values, a large number of "interpolated" probability distribution functions, lying (in the $D_p$, $D_n$ plane) between the six probability distribution functions illustrated in FIG. 2 are generated using an interpolation method based upon the Gaussian nature of the probability distribution functions of FIG. 2.

Figure 6:
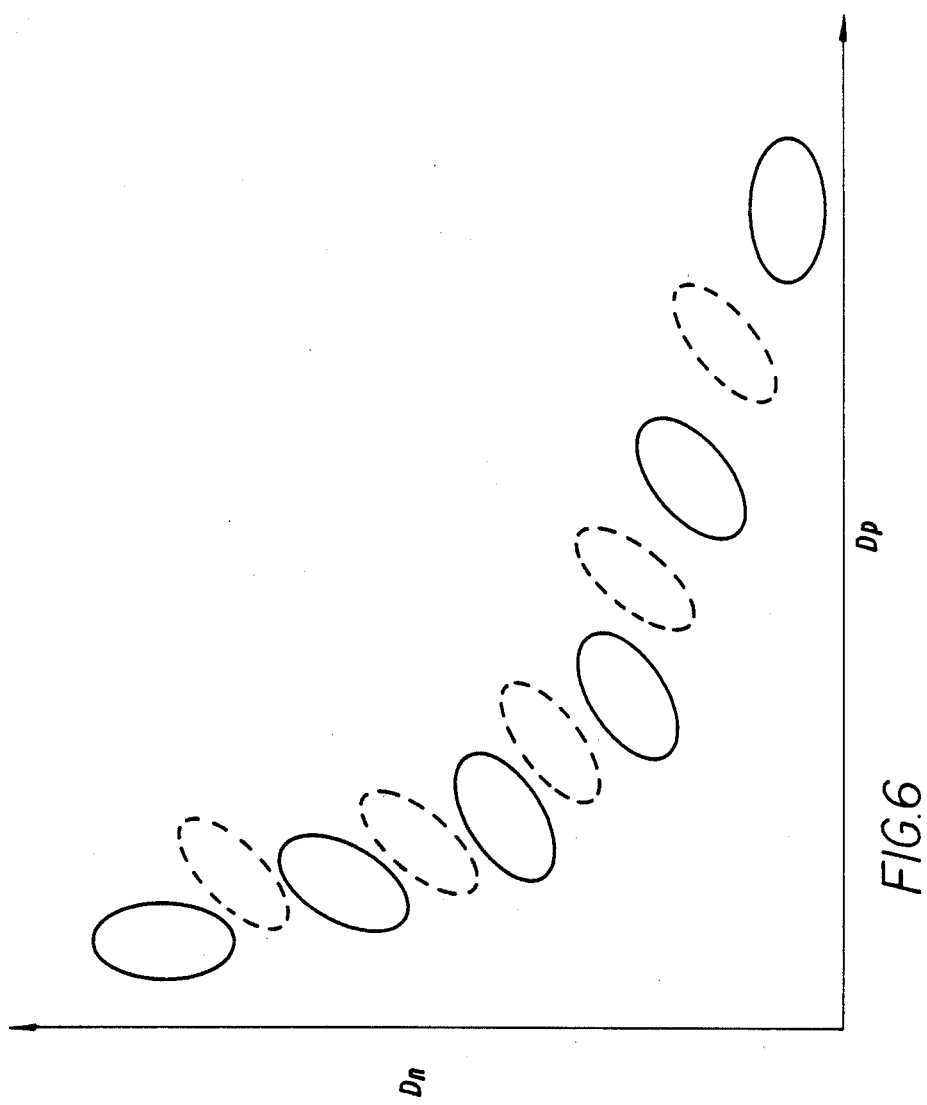
FIG. 6 illustrates the type of results obtained from the interpolation of FIG. 5.

The interpolation process is illustrated in FIG. 5 while the results are partially illustrated in a cross-sectional view in FIG. 6 corresponding to that of FIG. 3. In FIG. 6, the six probability distributions generated from the six calibration patches are illustrated in cross-section in solid line. An interpolated probability distribution lying between each adjacent pair of solid line probability distributions is illustrated in dashed line in FIG. 6, the interpolated (dashed line) probability distribution having been obtained using the interpolation process of FIG. 5.

In the preferred embodiment of the invention, 256 interpolated probability distribution functions (not shown in FIG. 6) are generated corresponding to 256 exposure values lying in the range of the minimum and maximum calibration exposure values $E_1$ and $E_6$. Preferably, $E_1$ and $E_6$ substantially span the exposure latitude of the film 100.

As illustrated in FIG. 5, the following process is performed for each of the six probability distribution functions illustrated in FIG. 2. First, the mean value of the negative dye density, $\overline{D}_n(E_i)$ at the $i^{th}$ one of the six calibration exposures is computed from the $i^{th}$ probability density function in accordance with equation (a) illustrated in FIG. 5. Six such mean values $\overline{D}_n(E_i)$ are thus obtained for each of the six values of i from 1 through 6. When these six values are plotted, the result is the graph illustrated in FIG. 5 of $\overline{D}_n$ vs. E. The same process is performed using equation (b) to compute the six mean values $\overline{D}_p(E_i)$, which generate six data points illustrated in the corresponding graph of $\overline{D}_p$ vs. E in FIG. 5. The variance $S_{nn}(E_i)$ is computed in accordance with equation (c) in FIG. 5 for each of the six probability distribution functions of FIG. 2, resulting in the corresponding graph of $S_{nn}$ vs. E in FIG. 5. In accordance with equation (d), the variance of the positive dye density values $S_{pp}(E_i)$ similarly is computed, which results in the graph of $S_{pp}$ vs. E in FIG. 5. Finally, the covariance $S_{pn}$ of the positive and negative dye density values is computed in accordance with equation (e) of FIG. 5 for each of the six probability density functions of FIG. 2, resulting in the corresponding graph in FIG. 5 of $S_{pn}$ vs. E.

If, for example, it is desired to compute the likeliest exposure value $\overline{E}$ with eight-bit resolution, then each of the graphs of FIG. 5 is interpolated so that 256 data points lie in the range from $i=1$ through $i=6$. The preferred method for interpolation is interpolation using quasi-cubic Hermite splines. The method is well-known and commercial software is available for performing the interpolation by cubic splines. The goal in interpolating between the six data points in each of the graphs above is to achieve the smoothest possible curve which most truly represents the six data points. The horizontal axes of each of the five graphs of FIG. 5 may now be thought of as having been divided into 255 equal segments separated by 256 points, with an index j which runs from 1 to 256, 256 points lying between the points designated $i=1$ and $i=6$. For each value of j, the corresponding values of $\overline{D}_n(E_j)$, $\overline{D}_p(E_j)$, $S_{nn}(E_j)$, $S_{pp}(E_j)$, $S_{pn}(E_j)$ are "picked off" the interpolated curves and a Gaussian probability distribution is then constructed from these five particular values in accordance with equation (f) of FIG. 5. This process is repeated for each value of j, so that 256 probability distributions are computed in accordance with equation (f). These are the interpolated probability distributions. It is the interpolated probability distributions (from equation f of FIG. 5) which are now substituted into equation 2 in place of the six original probability distributions (computed directly from the six calibration patches) to increase the exposure value resolution of the algorithm of FIG. 4. With this change, the summations in equation 2 (and in FIG. 4) are over 256 points (namely from $i=1$ to $i=256$) instead of only six points as indicated in equation 2.

Equation f in FIG. 5 is the well-known definition of the multivariate Gaussian probability distribution for two variables, in this case $D_n$ and $D_p$. The $^{-1}$ superscript in equation f indicates the inverse of a matrix, while the $^T$ superscript indicates the transpose of a vector, in accordance with standard notation.

SCRATCH SUPPRESSION

Many film defects, such as scratches, pinholes and dust, result in unreasonable values of $(D_p, D_n)$. More precisely, "unreasonable" means that the defect produces a joint density $(D_p, D_n)$ for which the probability $P(D_p, D_n|E)$ is very small for all possible values of E. Thus, by slightly modifying the algorithm to watch for unreasonable values of $(D_p, D_n)$, the algorithm can recognize many film defects.

A scratch detection algorithm and a scratch suppression algorithm have been added (here the word "scratch" is meant to be a generic word for the defects that can be detected), which recognize scratches as described above and suppress them. For each pixel recognized as scratched, the suppression algorithm defines a 3×3 neighborhood around the defective pixel. It searches that neighborhood for any non-defective pixels, and it keeps enlarging the neighborhood until it finds at least one non-defective pixel in the neighborhood. It then computes the median of all the non-defective pixels in the neighborhood, and replaces the original defective pixel by this median. This algorithm is repeated for each defective pixel.

The particular algorithm used for scratch suppression is not so important as the fact that scratches may be detected.

PREFERRED SYSTEM OF THE INVENTION (FIG. 7)

Figure 7:
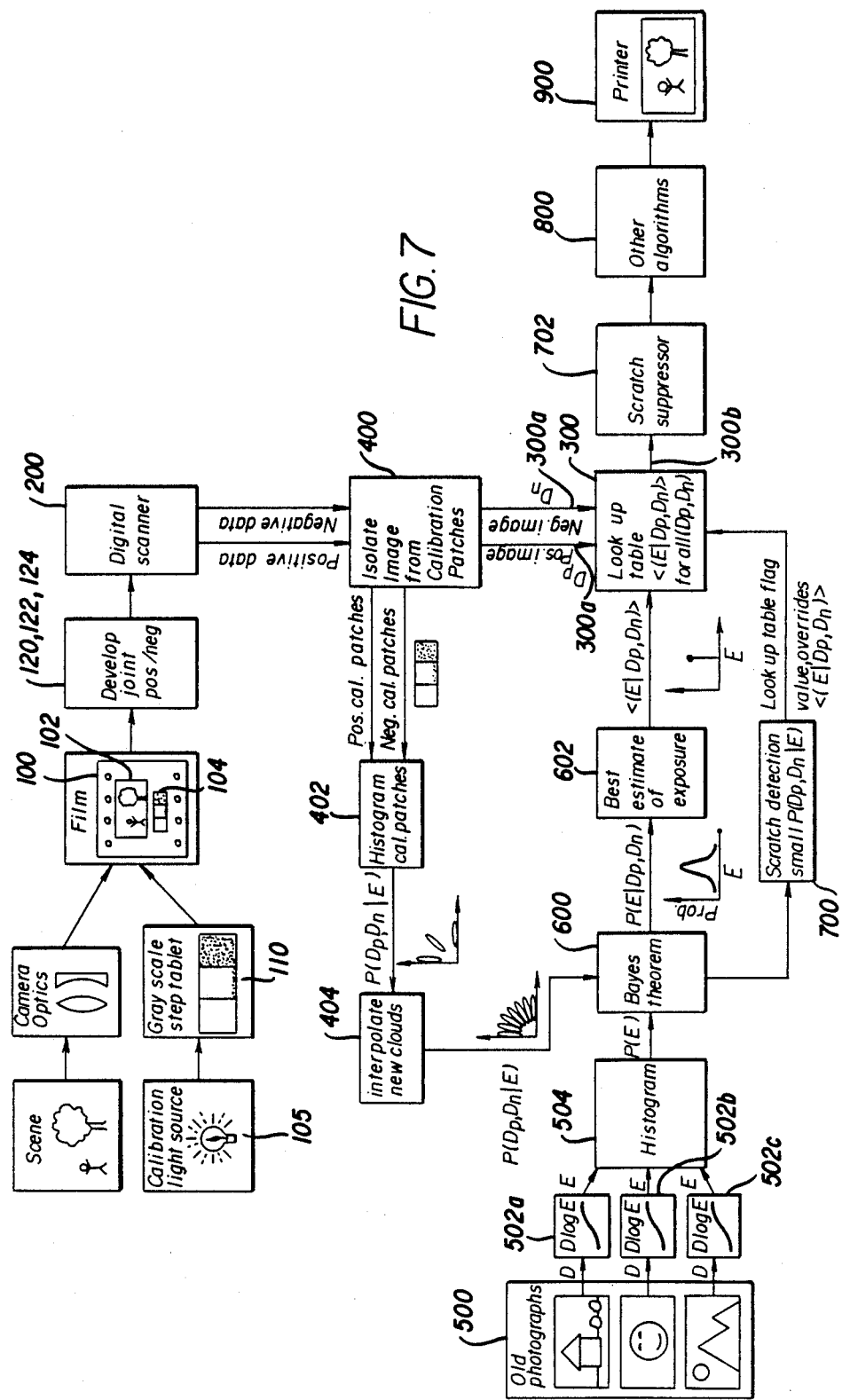
FIG. 7 is a block diagram illustrating the preferred embodiment of the invention.

In accordance with the foregoing detailed description, the complete preferred system of the invention is illustrated in FIG. 7. A scene viewed through camera optics is recorded on film 100 as an image 102. In addition, several calibration patches 104 are recorded on another portion of the film 100 using calibration light source 105 and a gray scale step tablet 110. As described in more detail in connection with FIG. 1 previously herein, joint positive and negative developers 120, 122, 124 generates a joint positive and negative color image from the film 100 corresponding to the recorded scene image 102 and the calibration patches 104.

The first step in the process of the invention is for digital scanner 200 to scan the plural calibration patches 104. As described previously, each patch is first scanned through a red filter and then through a green filter so that it separately scans negative and positive images. An isolation switch 400 routes the digital scanner data of the calibration patches to a histogram calibration patch processor 402 which forms plural histograms in accordance with the previous description given in connection with FIG. 2. Specifically, if there are six calibration patches within the calibration patch area 104 on the film 100, then the histogram processor 402 produces six histograms or probability distribution "clouds". An interpolation processor 404 then interpolates the six clouds to form 256 probability distribution clouds corresponding to 256 exposure values lying within the latitude of the film 100, in accordance with the process described previously in detail in connection with FIG. 5. These 256 probability distribution clouds are each designated $P(D_p, D_n|E_j)$, where the subscript $j$ runs from 1 through 256.

Next, a large archive of old photographs 500 representative of the type of scene which is expected to be recorded on the film 100 is scanned by a digital scanner (such as the digital scanner 200). This scanning results in a histogram of the number of times a particular exposure value is observed. This produces a probability distribution P(E) that a particular exposure value will be received. A Bayes theorem processor 600 performs the computation of equation (1) stated above on page 17 using all of the 256 probability distributions obtained from the interpolation processor 404 and the probability distribution obtained from the histogram processor 504. A best estimate (mean) of exposure processor 602 performs the computation of equation (2) stated above on page 18 using the results obtained from the Bayes theorem processor 600 to provide a best estimate of exposure for each joint value of positive and negative dye density $D_p$, $D_n$. These results are stored in a look-up table 300 in accordance with the detailed description given previously in connection with FIG. 4.

The system is now prepared to process the image 102 on the film 100. The isolation switch 400 now routes the user image data from the digital scanner 200 directly to the look-up table 300. For each pixel in the image 102, the digital scanner 200 transmits a joint positive/negative dye density $D_p$, $D_n$ through the isolation switch 400 to the address input of the look-up table 300. The look-up table 300 matches each joint dye density $D_p$, $D_n$ thus received to the corresponding estimated exposure value $\bar{E}$. The exposure value $\bar{E}$ thus determined is transmitted to a printer 900, which generates a corresponding image from the succession of likeliest exposure values $\bar{E}$ thus obtained.

In accordance with the description of the scratch suppression algorithm given on page 23 of the detailed description, a scratch detection processor 700 determines from the probability distributions generated by the Bayes Theorem processor 600 which joint dye densities $D_p$, $D_n$ correspond to unacceptably low probability amplitudes for all possible exposure values E. A scratch detection processor 700 causes all such unacceptable joint dye density values to be flagged in the look-up table 300. Thus, whenever such an unacceptable joint dye density value is received by the look-up table 300 from the digital scanner 200 (through the isolation switch 400), a flag is automatically raised so that the corresponding exposure values stored in the look-up table is not transmitted, but instead a special "flag" value is transmitted, and a scratch suppression processor 702 is activated. The missing exposure value is provided by the scratch suppression processor 702 as follows: For each pixel recognized as scratched, the suppression processor 702 defines a 3×3 neighborhood around the defective pixel. It searches that neighborhood for any non-defective pixels, and keeps enlarging the neighborhood until it finds at least one non-defective pixel in the neighborhood. It then computes the median of all non-defective pixels in the neighborhood, and replaces the original defective pixel by this median. The scratch suppression processor 702 operates in the same manner for each flag recognized from the look-up table 300.

In summary, the scratch detection processor 700 examines all the probabilities being computed in Bayes theorem processor 600, and takes note of any probabilities below threshold ("unreasonable" values). It then replaces the likeliest exposure value in the look-up table 300 with a special value, called the "scratch flag" value. Now the look-up table 300 is ready, and the image is passed from the isolation switch 400 to the scratch suppression processor 702 through the look-up table 300. The scratch suppression processor 702 monitors the values as they pass through. Any value which is not the "scratch flag" value is passed unchanged. When a "scratch flag" value is encountered, the scratch suppression algorithm is triggered, which grows a neighborhood and computes the median, and the "scratch flag" value is replaced by the median. Thus, for scratched pixels the look-up table 300 does not actually contain "likeliest exposure" values, but instead contains a "scratch flag" value.

Other algorithms 800 may be performed on the data before it is transmitted to the printer 900. Such other algorithms may include various image processes which are well-known in the art for enhancing images.

EXPERIMENTAL RESULTS (FIGS. 8–10)

The invention has been applied to a real film. This film is an ordinary, single layer emulsion. A glimpse at the experimental results is useful.

FIG. 8 shows the result of histogramming the calibration patches for the film, specifically the probability distributions $P(D_p, D_n|E)$ obtained from histogramming the calibration patches on a real film. The lowest exposure patch is plotted in red, the next higher exposure is plotted in green, next in blue, next in red, . . . . Exposures are separated by 0.3 log exposure (standard granularity neutral density step tablet). Overlapping locations are plotted in combined color (yellow where red and green overlap, cyan where green and blue overlap). $P(D_p, D_n|E)$ for a single E is named a "cloud," since the edges are fuzzy because of the decaying probability distribution. Each of the four frames represents a slice through the $P(D_p, D_n|E)$ at the percentage of peak height shown. The horizontal axis is $D_p$, the vertical axis is $D_n$.

The gross features are as expected, but many of the details, such as the locus traced by successive exposures, and the wide aspect ratio of the clouds even at the very low and very high exposures, are surprising. FIG. 9 shows the result of interpolating new clouds (multivariate Gaussian distributions). The figure shows 15 clouds for clarity. The algorithm was actually run with 256 interpolated clouds, but this figure shows the case of only 15 clouds for greater clarity.

FIG. 10 illustrates the eight clouds of the 15 interpolated clouds that correspond to the original measured eight clouds. These clouds are included in the bottom plot, but are separated out in the center plot for easier comparison with the top plot. Note that for the frame tagged ">0.0%", the plot simply shows the cutoff for calculating the multivariate normal $P(D_p, D_n|E)$ where the probability is very low. In fact, a multivariate normal distribution is everywhere larger than 0, so in principle each cloud fills the entire frame.

Note that while the choice of using multivariate normal distributions to represent the clouds is arbitrary, it appears to be a reasonable fit, and the results should be fairly insensitive to the accuracy of this choice.

While the invention has been described in detail with specific reference to preferred embodiments thereof, it is understood that variations and modifications thereof may be made without departing from the spirit and scope of the invention. In particular, there are other ways of computing $\bar{E}$ from $D_p$, $D_n$, but equations 1 and 2 are the best possible.

SOFTWARE IMPLEMENTATION

A portion of the disclosure of this patent document contains computer programs to which a claim of copyright protection is made. The copyright owner has no objection to the facsimile reproduction by anyone of the patent document or the Patent disclosure as it appears in the patent and Trademark Office patent file or records, but reserves all other rights whatsoever.

A C program for implementing in a general purpose computer the noise reduction process described with reference to FIGS. 5 and 7 is listed in the appendices, which may be referenced in the file of the application.

What is claimed is:

1. A method for obtaining an enhanced image from a photographic film susceptible of photographically recording in a frame thereof an image comprising individual image pixels of individual latent and non-latent photosensitive grain counts $D_p$ and $D_n$ respectively, said method comprising:

obtaining a plurality of K distributions of latent and non-latent grain count pairs $D_p$, $D_n$ for K predetermined exposure values, said K distributions being representative of said film;

determining from said K distributions a likeliest exposure value $E_i$ for each one of a plurality of grain count pairs $D_p$, $D_n$ so as to generate a corresponding plurality of likeliest exposure values; and measuring a grain count pair $D_p$, $D_n$ in a discrete pixel in said film frame and selecting a corresponding one of said likeliest exposure values so as to generate a set of likeliest exposure values representative of the image recorded in said film frame.

2. The method of claim 1 wherein said obtaining step comprises:

exposing a film strip to said K predetermined exposure levels so as to form K calibration patches in said film strip;

developing the latent and non-latent grains in said calibration patches in such a manner that a latent grain count $D_p$ and a non-latent grain count $D_n$ in discrete pixels therein may be measured separately;

measuring latent and non-latent grain count pairs $D_p$, $D_n$ in each discrete pixel in said K calibration patches so as to generate said K distributions.

3. The method of claim 2 wherein said film strip and said film frame are on one roll of film whereby said developing steps are carried out simultaneously in said calibration patches and in said film frame, whereby latent and non-latent grain counts are separately measureable in said film frame as well as in said calibration patches, and whereby said K distributions are exactly characteristic of said film.

4. The method of claim 1 further comprising the step of printing an image based on said set of exposure values representative of said image recorded in said film frame.

5. The method of claim 1 wherein said measuring step is preceeded by the step of developing the latent and non-latent grains in said film frame in such a manner that a latent grain count $D_p$ and a non-latent grain count $D_n$ in discrete pixels therein may be measured separately.

6. The method of claim 1 wherein said determining step comprises:

defining a set of N exposure values $E_j$ wherein $N > K$, said N exposure values corresponding to a range of exposure values spanned by said K exposure values;

computing a plurality of N distributions of grain counts pairs $D_n$, $D_p$ for said N exposure values from said K distributions; and determining from said N distributions said likeliest exposure value for each one of said plurality of grain count pairs $D_p$, $D_n$ so as to generate said corresponding plurality of likeliest exposure values.

7. The method of claim 6 wherein said computing step comprises interpolating between successive ones of said K distributions.

8. The method of claim 7 wherein said interpolating step comprises:

computing a mean value and a variance of $D_n$ and $D_p$ and computing a covariance of $D_n$ with $D_p$ for each one of said K distributions so as to define K magnitudes of said mean value, variance and covariance corresponding to said K exposure values;

interpolating between said K magnitudes at said N exposure values so as to define interpolated versions of each one of said mean value, variance and covariance at said N exposure values; and constructing an interpolated Gaussian probability distribution of grain count pairs $D_p$, $D_n$ for each one of said N exposure values from the corresponding interpolated versions of said means values, variances and covariance for each respective one of said N exposure values.

9. The method of claim 6 wherein said N exposure values span an exposure latitude of said photographic film.

10. The method of claim 9 wherein each of said K exposure values is defined by an m-bit binary word and wherein $N = 2^m$, whereby to utilize a full range and resolution with which said exposure values are defined.

11. The method of claim 6 further comprising the step of weighting said distributions in accordance with a predetermined probability distribution of exposure values prior to said determining step.

12. The method of claim 11 wherein said predetermined probability distribution of exposure values defines the probability of any pixel in said frame being exposed to a given exposure value.

13. The method of claim 1 further comprising the step of weighting said distributions in accordance with a predetermined probability distribution of exposure values prior to said determining step.

14. The method of claim 13 wherein said predetermined probability distribution of exposure values defines a probability of any pixel in said frame being exposed to a given exposure value.

15. The method of claim 13 wherein said weighting step computes a normalized weighted sum of said K distributions with said predetermined probability distribution in accordance with Bayes theorem.

16. The method of claim 1 further comprising the step of detecting for each pixel of said frame whether a scratch is present after said second measuring step, said method further comprising the step of foregoing said selecting step for a pixel whenever said detecting step detects a scratch and constructing an alternative exposure value by interpolating between the exposure values of neighboring pixels.

17. The method of claim 16 wherein said detecting step comprises determining a probability of occurence of the grain count pair $D_n$, $D_p$ measured in each pixel of said frame and flagging existence of a scratch whenever said probability is below a predetermined threshold value.

18. The method of claim 17 wherein said probability of occurrence is computed for each one of a set of exposure values spanning an exposure latitude of said photographic film.

19. The method of claim 1 wherein said developing step comprises developing said latent and non-latent grains sequentially using a different color dye for each.

20. The method of claim 19 wherein said latent grains are developed with one of positive and negative dyes, while said non-latent grains are developed with the other of said positive and negative dyes.

21. A system for obtaining enhanced images from photographic film in which there has been exposed a film frame to a scene so as to record an image therein, said system comprising:

means for developing latent and non-latent grains in said film frame in such a manner that a latent grain count $D_p$ and a non-latent grain count $D_n$ in discrete pixels therein may be measured separately;

means for storing a plurality of K distributions of latent and non-latent grain count pairs $D_p$, $D_n$ for K predetermined exposure values, said K distributions being representative of said film;

means for determining from said K distributions a likeliest exposure value $E_i$ for each one of a plurality of grain count pairs $D_p$, $D_n$ so as to generate a corresponding plurality of likeliest exposure values; and means for measuring a grain count pair $D_p$, $D_n$ in each discrete pixel in said film frame and selecting corresponding one of said likeliest exposure values so as to generate a set of likeliest exposure values representative of the image recorded in said film frame.

22. The system of claim 21 further comprising:

means for developing latent and non-latent grains in K calibration patches in a strip of film which has been exposed to said K predetermined exposure levels in such a manner that a latent grain count $D_p$ and a non-latent grain count $D_n$ in discrete pixels in said calibration patches may be measured separately;

means for measuring latent and non-latent grain count pairs $D_p$, $D_n$ in each discrete pixel in said K calibration patches so as to generate said K distributions, and for transmitting said K distributions to said means for storing.

23. The system of claim 22 further comprising means for developing latent and non-latent grains in said film frame in such a manner that a latent grain count $D_p$ and a non-latent grain count $D_n$ in discrete pixels therein may be measured separately.

24. The method of claim 22 wherein said film strip and said film frame are on one roll of film whereby said K distributions exactly characterize said film.

25. The system of claim 21 further comprising means for printing an image based on said set of exposure values representative of said image.

26. The system of claim 21 wherein said means for developing said grains in said calibration patches and said means for developing said grains in said film frame are one and the same.

27. The system of claim 21 wherein said means for determining comprises:

means for computing a set of N distributions of grain count pairs $D_n$, $D_p$ for a plurality of N predetermined exposure values, wherein $N>K$, said N exposure values correspond to a range of exposure values spanned by said K exposure values; and means for determining from said N distributions said likeliest exposure value for each one of said plurality of grain count pairs $D_p$, $D_n$ so as to generate said corresponding plurality of likeliest exposure values.

28. The system of claim 27 wherein said means for computing comprises means for interpolating between successive ones of said K distributions.

29. The system of claim 28 wherein said means for interpolating comprises:

means for computing a mean value and a variance of $D_n$ and $D_p$ and computing a covariance of $D_n$ with $D_p$ for each one of said K distributions so as to define K magnitudes for each mean value, variance and covariance corresponding to said K exposure values;

means for interpolating between said K magnitudes at said N exposure values so as to define interpolated magnitudes of said mean value, variance and covariance at said N exposure values; and means for constructing an interpolated Gaussian probability distribution of grain count pairs $D_p$, $D_n$ for each one of said N exposure values from the interpolated magnitudes of said means value, variance and covariance for each respective one of said N exposure values.

30. The system of claim 27 wherein said N exposure values span an exposure latitude of said film.

31. The system of claim 30 wherein each of said K exposure values is defined by an m-bit binary word and wherein $N=2^m$, whereby to utilize a full range and resolution with which said exposure values are defined.

32. The system of claim 27 further comprising means connected to said means for determining for weighting said distributions in accordance with a predetermined probability distribution of exposure values.

33. The system of claim 32 wherein said predetermined probability distribution of exposure values defines the probability of any pixel in said frame being exposed to a given exposure value.

34. The system of claim 21 further comprising means for weighting said distributions in accordance with a predetermined probability distribution of exposure values, said means for weighting being connected to said means for determining.

35. The system of claim 34 wherein said predetermined probability distribution of exposure values defines the probability of any pixel in said frame being exposed to a given exposure value.

36. The system of claim 34 wherein said means for weighting computes a mormalized weighted summation in accordance with Bayes theorem of said K distributions with said predetermined probability distribution.

37. The system of claim 21 further comprising means for detecting for each pixel in said frame whether a scratch is present, said means for detecting being connected to said means for measuring, said system further comprising means for foregoing said selecting step for a pixel whenever said detecting step detects a scratch and constructing an alternative exposure value by interpolating between the exposure values of neighboring pixels.

38. The system of claim 37 wherein said means for detecting comprises means for determining a probability of occurence of a respective grain count pair $D_n$, $D_p$ measured in a respective pixel in said frame and flagging existence of a scratch whenever said probability is below a predetermined threshold value.

39. The system of claim 38 wherein said probability of occurence is computed by said means for detecting for each one of a set of exposure values spanning an exposure latitude of said film.

40. The system of claim 21 wherein said means for developing comprises means for developing said latent and non-latent grains sequentially using a different color dye for each.

41. The system of claim 40 wherein said latent grains are developed with one of positive and negative dyes, while said non-latent grains are developed with the other of said positive and negative dyes.

42. A system for producing an enhanced image from film which has been exposed to a user image and to a plurality of K predetermined exposure levels in K corresponding calibration patches, said film having latent and non-latent grains, said system comprising:

latent grain developing means for producing a dye site of a first color at each latent grain in said film;

non-latent grain developing means for producing a dye site of a second color at each non-latent grain in said film, whereby said latent grain developing means and said non-latent grain developing means together produce a two-colored developed image;

scanner means for viewing said two-colored developed image as an array of N picture elements (pixels) and for determining, for each of said K calibration patches, a dye amount $D_p$ in each of said N pixels of said first color, and a dye amount $D_n$ of said second color in said developed image;

first processor means responsive to said scanner means for producing, for an $i^{th}$ one of said K calibration patches, a distribution $P(D_n, D_p|E_i)$ of a number of pixels having a particular joint dye amount $D_n$, $D_p$, so as to produce an ensemble comprising a plurality of K distributions;

second processor means responsive to said first processor means for computing, for plural joint dye counts $D_n$, $D_p$ in a range, a likeliest exposure value $\bar{E}$ using a normalized weighted sum of products of each of said distribution $P(D_n, D_p|E_i)$ with a corresponding exposure level $E_i$;

means connected to said second processor means for storing a look-up table correlating each exposure value $\bar{E}$ with a corresponding joint dye amount $D_n$, $D_p$;

third processor means responsive to said scanning means for determining from said look-up table a likeliest exposure value corresponding to a given joint dye count $D_n$, $D_p$ for each pixel in said user image so as to accumulate an array of exposure values corresponding to an enhanced version of said user image.

43. The system of claim 42 wherein said first processor means comprises:

fourth processor means for interpolating among K of said distributions $P(D_n, D_p|E_i)$ where $1 \leq i \leq K$ so as to produce, as said ensemble of distributions, M interpolate distributions $P(D_n, D_p|E_j)$ where $1 \leq j \leq M$ and $M \leq K$, and wherein said second processor means computes a normalized weighted sum:

$$E(D_p, D_n) = \sum_{i=1}^{M} E_i P(D_p, D_n|E_i)P(E_i) / \sum_{i=1}^{M} P(D_p, D_n|E_i)P(E_i).$$

44. The system of claim 43 wherein said fourth processor means comprises:

means for computing, from said K distributions, K corresponding values of:

$\bar{D}_p$, a mean value of $D_p$,
　　$\bar{D}_p$, a mean value of $D_n$,
　　$S_{pp}$, a variance of $D_p$,
　　$D_{nn}$, a variance of $D_n$, and
　　$S_{pn}$, a covariance of $D_n$ and $D_p$;

means for interpolating M points among:
　　K mean values $\bar{D}_n$,
　　K mean values $\bar{D}_p$,
　　K variances $S_{nn}$,
　　K variances $S_{pp}$,
　　K covariances $S_{pn}$;

means for computing, from said M interpolated points, said M interpolated distributions $P(D_n, D_p|E_j)$.

45. The system of claim 42 further comprising scratch suppression means, said scratch suppression means comprising:

scratch detection means for detecting whenever a pixel is sensed in said user image having a joint dye count $D_n$, $D_p$ which, when substituted into probability distributions for said exposure levels, produces a number below a predetermined threshold;

scratch removal means responsive to said scratch detection means for ignoring a corresponding likeliest exposure value $\bar{E}$ stored in said means for storing a look-up table, and instead generating a likeliest exposure value by obtaining from said means for storing a look-up table an average exposure value of pixels surrounding said given pixel but not including said given pixel.

46. The system of claim 42 further comprising means for scanning a plurality of known images and determining therefrom an a priori probability distribution of receiving a given exposure level for a range of exposure levels spanning an exposure latitude of said film, and wherein each probability distribution in said second processor means is weighted by said a priori probability distribution.

47. A system for producing an enhanced image from film which has been exposed to a user image and to a plurality of K predetermined exposure levels in K corresponding calibration patterns, said film having latent and non-latent grains, said system comprising:

latent grain developing means for producing a dye site of a first color at each latent grain in said film;

non-latent grain developing means for producing a dye site of a second color at each non-latent grain site in said film, whereby said latent grain developing means and said non-latent grain developing means together produce a two-colored developed image;

scanner means for viewing said two colored developed image;

first processor means responsive to said scanning means for determining a probability distribution $P(D_n, D_p|E)$ that a joint dye amount $D_n$, $D_p$ in one of said pixels was produced by an exposure level $E_i$ in a range corresponding to said K predetermined exposure levels so as to produce a plurality of probability distributions $P(D_n, D_p|E_i)$;

second processor means responsive to said first processor means for determining a likeliest exposure level $\bar{E}$ for a given joint dye count $D_n$, $D_p$, as a normalized weighted sum of products of each of said distribution $P(D_n, D_p|E_i)$ and a corresponding one of said exposure levels $E_i$, for plural dye counts $D_n$, $D_p$ lying within a range;

look-up table means connected to said second processor means for storing a likeliest exposure $\bar{E}$ with a corresponding joint dye count $D_n$, $D_p$;

means for addressing said look-up table means with a joint dye count $D_n$, $D_p$ from a pixel in said user image sensed by said scanner means so as to obtain a corresponding likeliest exposure value so as to accumulate an array of exposure values corresponding to an enhanced version of said user image.

48. The system of claim 47 wherein said first processor means comprises:

third processor means for interpolating among K of said distributions $P(D_n, D_p|E_i)$ where $1 \leq i \leq K$ so as to produce, as said ensemble of distributions, M interpolated distributions $P(D_n, D_p|E_j)$ where $1 \leq j \leq M$ and $M > K$, and wherein said second processor means computes a normalized weighted sum:

$$E(D_p, D_n) = \sum_{i=1}^{M} E_i P(D_p, D_n|E_i) P(E_i) / \sum_{i=1}^{M} P(D_p, D_n|E_i) P(E_i).$$

49. The system of claim 48 wherein said third processor means comprises:
means for computing, from said K distributions, K corresponding values of:
$\overline{D}_p$, a mean value of $D_p$,
$\overline{D}_n$, a mean value of $D_n$,
$S_{pp}$, a variance of $D_p$,
$S_{nn}$, a variance of $D_n$, and
$S_{pn}$, a covariance of $D_n$ and $D_p$;
means for interpolating M points among:
K mean values $\overline{D}_n$,
K mean values $\overline{D}_p$,
K variances $S_{nn}$,
K variances $S_{pp}$,
K covariances $S_{pn}$;
means for computing, from said M interpolated points, said M interpolated distributions $P(D_n, D_p|E_j)$.

50. The system of claim 47 wherein further comprising scratch suppression means, said scratch suppression means comprising:
scratch detection means for detecting whenever a pixel is sensed in said user image having a joint dye count $D_n$, $D_p$ which, when substituted into probability distributions for said exposure levels, produces a number below a predetermined threshold;
scratch removal means responsive to said scratch detection means, for ignoring a corresponding likeliest exposure value $\overline{E}$ stored in said means for storing a look-up table, and instead generating a likeliest exposure value by obtaining from said means for storing a look-up table an average exposure value of pixels surrounding said given pixel but not including said given pixel.

51. The system of claim 47 further comprising means for scanning a plurality of known images and determining therefrom an a priori probability distribution of receiving a given exposure level for a range of exposure levels spanning an exposure latitude of said film, and wherein each probability distribution in said second processor means is weighted by said a priori probability distribution.

* * * * *

UNITED STATES PATENT AND TRADEMARK OFFICE
CERTIFICATE OF CORRECTION

PATENT NO. : 4,977,521

DATED : December 11, 1990

INVENTOR(S) : Martin C. Kaplan

It is certified that error appears in the above-identified patent and that said Letters Patent is hereby corrected as shown below:

| | |
|---|---|
| Column 17, line 53 | "correspond" should read --corresponding-- |
| Column 19, line 47 | "M≤K" should read --M>K-- |
| Column 19, line 51 | "E" should read --$\overline{E}$-- |
| Column 19, line 59 | "$D_p$" should read --$\overline{D}_n$-- |
| Column 19, line 61 | "$D_{nn}$" should read --$S_{nn}$-- |
| Column 21, line 11 | "E" should read --$\overline{E}$-- |

Signed and Sealed this

Twelfth Day of May, 1992

*Attest:*

DOUGLAS B. COMER

*Attesting Officer*     *Acting Commissioner of Patents and Trademarks*